(12) United States Patent
Perng et al.

(10) Patent No.: US 8,305,195 B2
(45) Date of Patent: Nov. 6, 2012

(54) RADIO FREQUENCY IDENTIFICATION COMMUNICATION SYSTEM AND METHOD THEREOF

(75) Inventors: Shin-Yao Perng, Hsinchu (TW); Ta-Yung Lee, Hsinchu (TW); Chih-Wen Cheng, Hsinchu (TW); Yuan-Ning Hsieh, Hsinchu (TW)

(73) Assignee: Getac Technology Corp., Taipei (TW)

( * ) Notice: Subject to any disclaimer, the term of this patent is extended or adjusted under 35 U.S.C. 154(b) by 940 days.

(21) Appl. No.: 12/242,299

(22) Filed: Sep. 30, 2008

(65) Prior Publication Data
US 2010/0079247 A1 Apr. 1, 2010

(51) Int. Cl.
*H04Q 5/22* (2006.01)
(52) U.S. Cl. .............. 340/10.34; 340/10.31; 340/10.3; 340/10.33
(58) Field of Classification Search .......... 340/10.3, 340/10.31, 10.33, 10.34, 10.5–10.52, 10.1
See application file for complete search history.

(56) References Cited

U.S. PATENT DOCUMENTS

| | | | | |
|---|---|---|---|---|
| 5,347,280 | A | * | 9/1994 | Schuermann ................. 342/42 |
| 5,887,176 | A | * | 3/1999 | Griffith et al. ................. 713/320 |
| 6,593,845 | B1 | * | 7/2003 | Friedman et al. .......... 340/10.33 |
| 7,069,119 | B2 | * | 6/2006 | Ueda et al. ...................... 701/2 |
| 7,236,742 | B2 | * | 6/2007 | Hall et al. ..................... 455/41.3 |
| 7,953,030 | B2 | * | 5/2011 | Seo et al. ...................... 370/311 |
| 7,986,217 | B2 | * | 7/2011 | Barnes et al. ................. 340/10.1 |
| 2006/0022802 | A1 | * | 2/2006 | Bridgelall .................. 340/10.33 |
| 2008/0136603 | A1 | * | 6/2008 | Choi et al. .................. 340/10.33 |
| 2010/0048127 | A1 | * | 2/2010 | Stucki et al. ................. 455/41.1 |

* cited by examiner

*Primary Examiner* — Albert Wong
*Assistant Examiner* — Peter Mehravar
(74) *Attorney, Agent, or Firm* — Apex Juris, pllc; Tracy M. Heims

(57) ABSTRACT

A radio frequency identification (RFID) communication system and method is provided to resolve the power-consuming problems of an active RFID tag while operating at a receiving mode in a long duration. A designated channel is established between the reader and the RFID tag, and also the reader sends a designated message so that the actuated active RFID tag can receive the designated messages and dynamically enter into a receiving mode. Therefore, normal communications may be conducted between the reader and the RFID and the usage period or technical performance can be improved as well.

20 Claims, 5 Drawing Sheets

RADIO FREQUENCY IDENTIFICATION COMMUNICATION SYSTEM AND METHOD THEREOF

BACKGROUND OF THE INVENTION

1. Field of Invention

The present invention relates to a radio frequency identification (RFID) communication system and method; more particularly, the present invention relates to a RFID communication system and method that send designate messages through certain channels so as to dynamically actuate a receiving mode of an active RFID tag.

2. Related Art

The radio frequency identification (RFID) system consists of a reader and an RFID tag. Usually the RFID tag is either active or passive, mainly depending upon whether the RFID tag has electrical power. A powered RFID tag is active; otherwise, it is passive. Either active or passive, the RFID tag is used to transmit data to the reader for further processing. For example, the reader receives data from the active RFID tag and transmits them to the subsequent application system, thereby determining he location of the RFID tag or checking identification.

Some manufacturers propose RFID tag designs that can provide a receiving mode for receiving commands emitted by the reader, so that the command can be executed. However, using the power inside the active RFID tag for the receiving mode greatly reduces the running time thereof. Therefore, even though the above-mentioned method enables the active RFID tag to have both transmitting and receiving abilities, the power consumption is also greatly increased. This problem is particularly serious when the RFID tag is in the receiving mode for a long time.

In summary, the active RFID tag in the prior art always has the problem of too much power consumption in the receiving mode. It is therefore imperative to provide an improved technique to solve the problem.

SUMMARY OF THE INVENTION

To resolve the aforesaid technical problems of the prior art, the present invention provides a radio frequency identification (RFID) communication system and method.

In an embodiment of the present invention, a radio frequency identification (RFID) communication system uses a standard channel for RFID communications. The RFID system includes a reader and one or more active RFID tag. The reader initializes a designated channel when the reader starts and transmits at last one designated message at a first time interval through the designated channel. The active RFID tag includes a channel initializing module, a receiving module, an identification (ID) module and a processing module. The channel initializing module initializes the designated channel when it starts to communicate with the reader though the designated channel. The receiving module triggers a receiving state at a second time interval to receive the designated message. The identification (ID) module, after receiving the designated message, compares an ID code recorded in the designated message with a pre-determined ID code and determines the validity of the designated message according to the comparison result. The processing module performs processes corresponding to an executing routine command in the designated message when the designated message is valid.

In another embodiment of the present invention, a RFID communication method uses a standard channel for RFID communications. The method comprises the following steps. First of all, initialize a designated channel on a reader and at least one active RFID tag for the reader and the RFID tag to communicate via the designated channel. Next, continuously transmit at least one designated message in a first time interval via the designated channel by the reader. Afterwards trigger a receiving state at a second time interval by the active RFID tag for receiving the designated message. After receiving the designated message, compares a pre-determined ID code with an ID code recorded in the designated message, thereby checking the validity of the designated message. Finally, when the designated message is valid, perform processes corresponding to an executing routine command in the designated message.

The major differences between the present invention and the prior art are explained as follows. The present invention sets up a designated channel between the RFID reader and the active RFID, and also the reader sends designated messages so that the actuated active RFID tag can receive the designated messages and dynamically enter into a receiving mode and thereby conducting normal communications between the reader and the RFID tag.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

Figure 1:
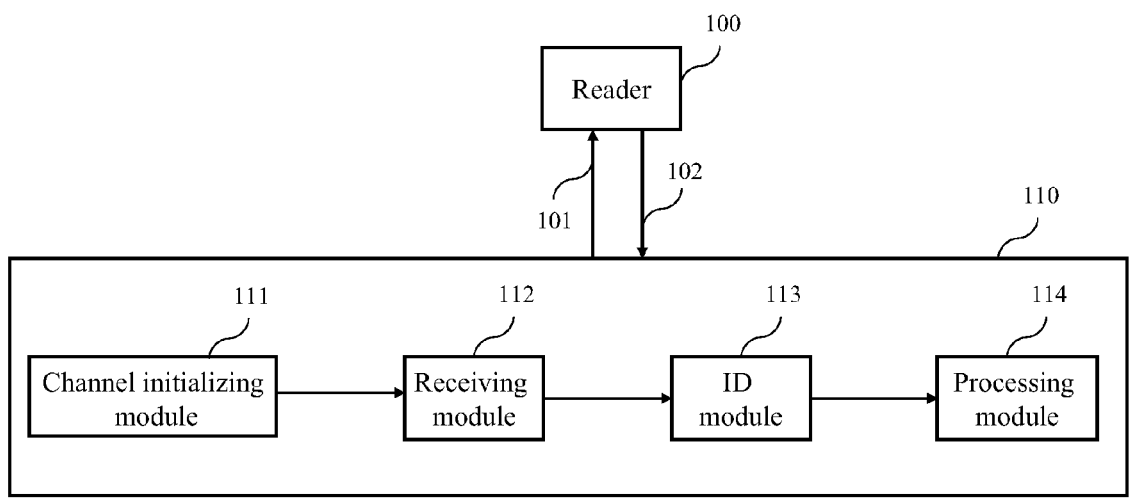
FIG. 1 is the block diagram of the RFID communication system according to the invention.

Reference will now be made in detail to the present preferred embodiments of the invention, examples of which are illustrated in the accompanying drawings. Wherever possible, the same reference numbers are used in the drawings and the description refers to the same or the like parts.

Before explaining the disclosed RFID communication system and the method thereof, we first describe the disclosed structure. The invention is used in an RFID system that has an RFID tag and a reader. The RFID referred here is active. That is, it has a battery as its power supply device. The wireless transmission between the active RFID tag and the reader is done via broadcasting. In addition to using the standard channel that is defined in the RFID techniques for continuously transmitting signals to the reader, there is another assigned channel for receiving signals transmitted from the reader. It should be mentioned that the active RFID tag triggers the receiving mode at a specific interval, but otherwise stays idle in order to reduce the power consumption. In addition to receiving signal transmitted from the active RFID tag, the reader also transmits a designated message containing an ID code to a particular active RFID tag via broadcasting. After receiving the designated message, all the active RFID tags determine whether further processing is required according to the ID code.

As mentioned before, the active RFID tag triggers the receiving mode at a particular interval. The on time of the receiving mode has to be greater than or equal to the time required for the reader to transmit the designated message. This ensures that the designated message can be completely received by the active RFID tag in its receiving mode. Besides, the reader can continuously transmit multiple same designated messages within a period (e.g., 5 seconds) by broadcasting. This period has to be greater than the idle time of the active RFID tag (time other than the receiving mode). This ensures that the active RFID tag enters the receiving mode at least once while the reader transmits the designated message. Moreover, the reader can perform a single-time transmission of the designated message by broadcasting when necessary. Note that the invention does not have any restriction on the number of times the designated message is transmitted.

Afterwards, we explain the terms defined in the specification as follows. The designated channel referred herein after is another working channel based on wireless RFID technology that is different from the standard channel for signal transmissions. For example, the standard active RFID tag uses the 433 KHz channel for signal transmissions. The frequency used for designated channel can be selected from 13.56 MHz, 2.45 GHz, 860~960 MHz, or 125 KHz for receiving the designated message transmitted from the reader. The designated message contains parameters for controlling the active RFID tag to execute a specific routine. The active RFID tag thereby performs corresponding processes. For example, if the received designated message contains display parameters or sound parameters, the system drives the display device or sounds device of the active RFID tag.

The time intervals referred hereinafter have at least two parts. The first part is the interval for the reader to transmit the designated message (i.e., the first time interval). The second part is the interval between the time the active RFID tag leaves the receiving mode and the next time it enters the receiving mode again (i.e., the second time interval). The time intervals are predetermined. They can also be set by pressing the function key of the reader or active RFID tag, or in a wireless way. The setting can further be done through a setting packet from the gateway to at least one of the reader and the active RFID tag. During the setting, the first time interval can be smaller than the second time interval. This prevents the active RFID tag from missing the designated message from the reader because it is in the second time interval state.

In practice, there may be five kinds of time parameter settings. Theses include: (Ta) the total emission time of the reader (e.g., 5 sec); (Tb) the time length of each message from the reader (e.g., 2 ms, the transmission time); (Tc) the time interval between consecutive data of the reader (e.g., 2 ms, the first time interval); (Td) the time interval between the time when the active RFID tag leaves the receiving mode and the next time it enters the receiving mode (the second time interval); and (Te) the reception waiting time after the active RFID tag enters the receiving mode (e.g., 2 ms, the maintaining time). Its basic setting rules at least include:

(Ta) the total emission time of the reader has to be greater than (Td) the time interval between the time when the active RFID tag leaves the receiving mode and the next time it enters the receiving mode (the second time interval); and (Te) the reception waiting time after the active RFID tag enters the receiving mode has to be greater than or equal to (Tc) the time interval between consecutive data of the reader, thereby ensuring the reception of each message.

Since the reader transmits the designated message by broadcasting, the designated message can be received by many active RFID tags. To make sure that the designated message is received by the correct active RFID tag and that the designated routine is executed, the reader has to embed an ID code into the designated message. Therefore, all the active RFID tags that receive this designated message can determine according to the ID code therein whether the designated message needs to be processed.

Before describing embodiments of the invention, we first explain the disclosed RFID communication system and the method thereof. Please refer to FIG. 1, the block diagram of the RFID communication system according to the invention. The system includes: a reader 100 and an active RFID tag 110. RFID communications between the reader 100 and the active RFID tag 110 are done via the standard channel 101. The reader 100 initializes a designated channel 102 when it starts. Designated messages are transmitted via the designated channel 102. The active RFID tag 110 includes: a channel initializing module 111, a receiving module 112, an identification (ID) module 113, and a processing module 114.

As described above, the channel initializing module 111 is used to initialize the designated channel 102 in order to communicate with the reader. The designated channel 102 is another working channel using the RFID technology. The receiving module 112 triggers the receiving mode according to the predetermined time interval for receiving the designated message. The maintaining time of the receiving mode is set to be greater than the transmission time of the designated message (for example, the time for the reader 100 to transmit the designated message is 0.1 second, and the maintaining time of the receiving mode is set to be greater than 0.1 second, e.g. 0.15 second). Moreover, the maintaining time of the receiving mode can be dynamically adjusted according to the receiving condition of the designated message. For example, suppose the receiving module 112 is receiving the designated message. If the designated message is not completely received within the predetermined maintaining time, the maintaining time is increased until the designated message is received over. The time interval referred here has been defined before and is not further described. It should be emphasized that the designated message referred herein does not have any restriction on the parameters contained therein.

When the ID module 113 receives the designated message, it determines its legitimacy according to the ID code. The ID code is the device serial number of the active RFID tag (and therefore unique). For example, when the reader 100 broadcasts the designated message with an embedded ID code of "1234," then all the active RFID tags 110 that receive this designated message determine whether the ID code therein complies with their own ID codes. If they are the same (i.e., the ID code of the active RFID tag 110 us also "1234"), then the process corresponding to the designated message is executed; otherwise, nothing is done. When the processing module 114 determines that the designated message is valid (i.e., the ID code in the designated message and the ID code in the active RFID tag 110 are the same), it performs the process corresponding to the executing routine commands in the designated message. (For example, if the designated message contains display parameters, the active RFID tag 110 triggers the display device for display according to the parameters.) The executing routine commands include parameters for the active RFID tag 110 to perform display or play sound. The detail will be described later with reference to FIGS. 3 and 4.

Figure 2:
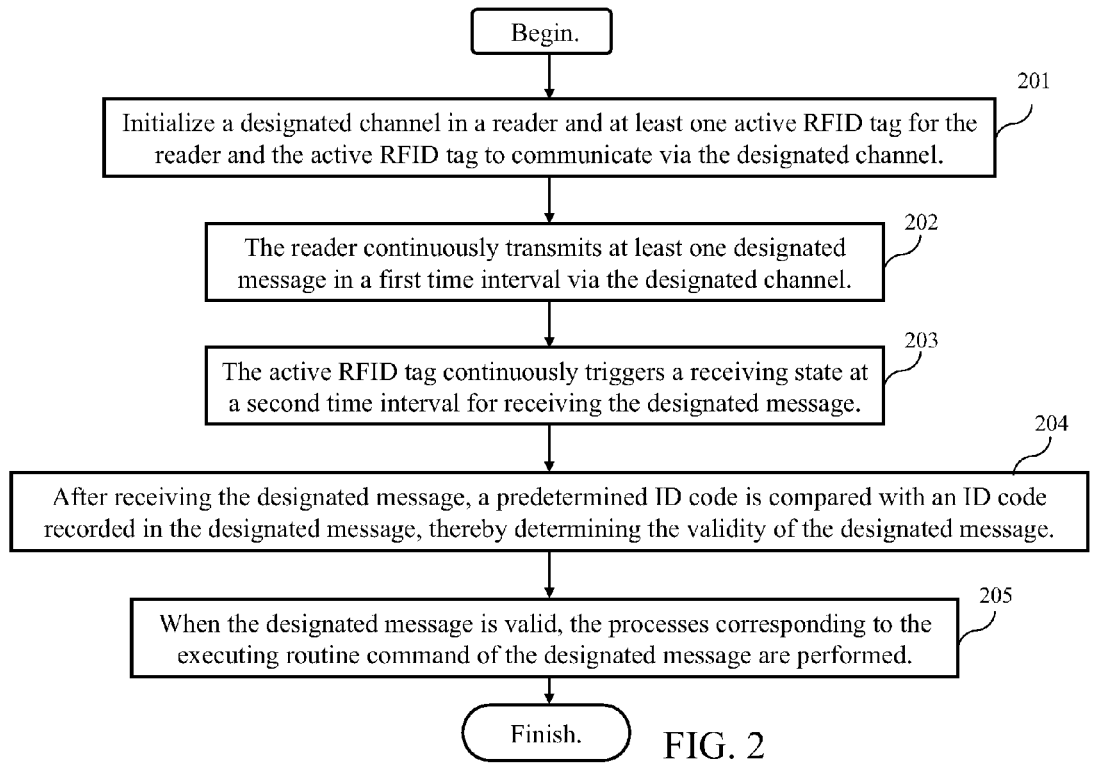
FIG. 2 is a flowchart of the disclosed RFID communication method.

FIG. 2 is a flowchart of the disclosed RFID communication method. The method includes the following steps. In step 102, the designated channel 102 in the reader 100 and the active RFID tag 110 is initialized so that they can communicate via the designated channel 102. In step 202, the reader 100 transmits the designated message via the designated channel 102. In step 203, the active RFID tag 110 periodically triggers the receiving state to receive the designated message. After the designated message is received, it checks the validity thereof from its ID code in step 204. When the designated message is valid, the corresponding process is executed in step 205. Through the above-mentioned steps, the designated channel 102 can be established between the reader 100 and the active RFID tag 110. The reader 100 then transmits the designated message, so that the active RFID tag 110 can receive it by periodically turning on its receiving state to communicate with the reader 100. Consequently, the active RFID tag 110 can enjoy a longer on time.

Figure 3:
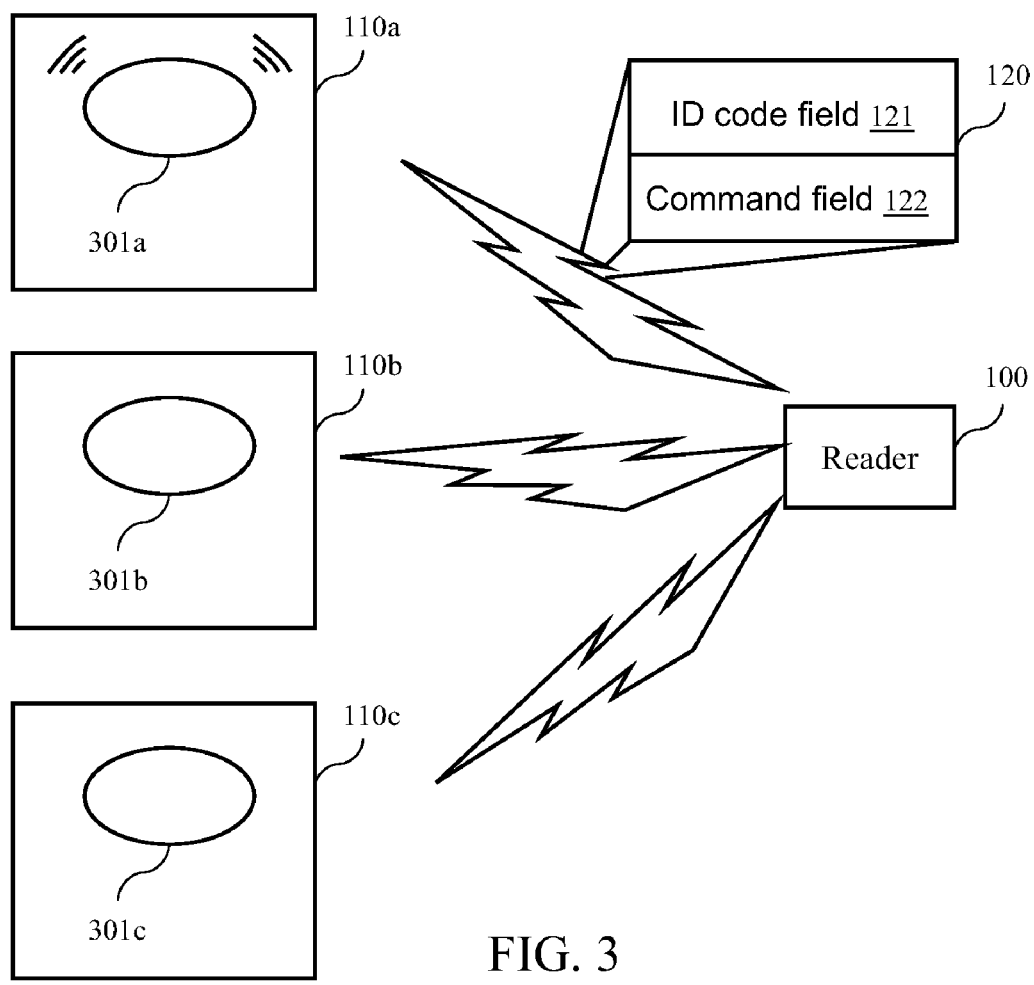
FIG. 3 is a schematic view showing that the invention receives a designated message and plays a sound accordingly.
Figure 4:
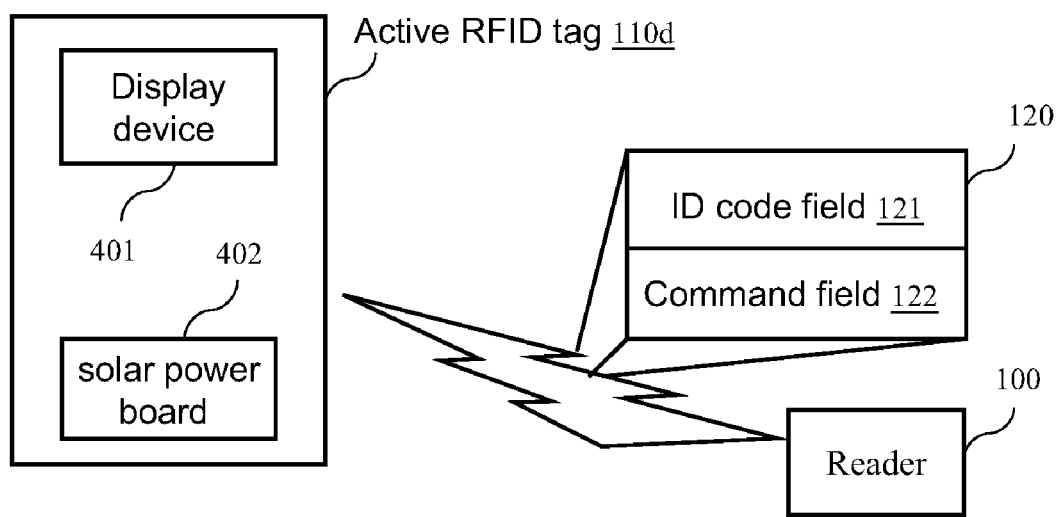
FIG. 4 is a schematic view showing that the invention receives a designated message and performs a display accordingly.
Figure 5:
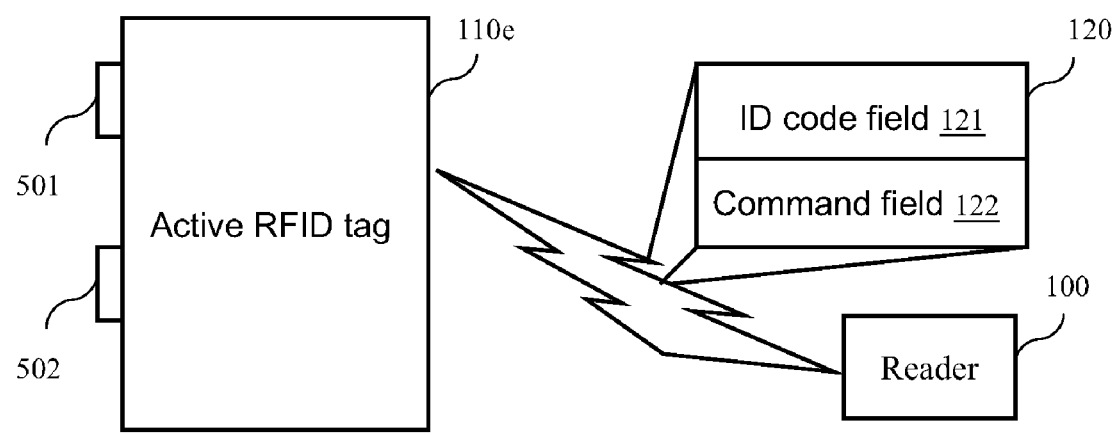
FIG. 5 is a schematic view showing how to set the time intervals according to the invention.

The following description refers to FIGS. 3 to 5. FIG. 3 is a schematic view showing that the invention receives a designated message and plays a sound accordingly. As shown in the drawing, the reader 100 and the active RFID tags 110a~110c initialize the designated channel 102 when they start (e.g., initializing the designated channel as the 13.56 MHz channel) so that they can communicate via the designated channel 102. After the initialization, the system enters the operating state. When the reader 100 broadcasts the designated message through the designated channel 102, the designated message can be packaged into a message packet 120 that contains the fields of ID code 121 and command 122. After the channel initializing module 111 initializes the designated channel 102, the active RFID tag 110a~110c triggers the receiving state periodically (e.g., every 0.5 second) via the receiving module 112 for receiving the designated message. The maintaining time of the receiving state is pre-determined to be greater than the transmission time of the designated message. For example, it takes 0.1 second for the reader 100 to transmit the designated message. The maintaining time of the receiving state is then set as 0.15 second.

After the active RFID tags 110a~110c receive the message packet 120, the message packet 120 is unpacked to obtain the designated message. Afterwards, the ID module 113 determines the validity of the designated message according to the ID code therein (e.g., the ID code being "1234"). The determination is done by comparing the ID code with the ID code of the active RFID tags 110a~110c (e.g., the ID code of the active RFID tag 110a being "1234"). In this example, of the comparison result of the active RFID tag 110a is positive (meaning that the ID code in the designated message is the same as the ID code of the active RFID tag 110a itself), then the designated message is valid. The comparison results of the other active RFID tags 110b~110c are negative. Therefore, the processing module 114 of the active RFID tag 110a performs the corresponding processes according to the executing routine commands (recorded in the command field 122 of the message packet 120). For example, when the active RFID tag 110a has a speaker 301, as shown in FIG. 3, the designated message may contain parameters that control the active RFID tag 110a to make sounds (e.g., making beeps).

FIG. 4 is a schematic view showing that the invention receives a designated message and performs a display accordingly. The active RFID tag 110 may be the active RFID tag 110d in FIG. 4 that has a display device 401 (e.g., liquid crystal display). Moreover, the designated message contains parameters that control the active RFID tag to perform a display. A message for the user (e.g., the power of the active RFID tag 110d) is then displayed. To save the power consumption of the active RFID tag 110d, one may provide another power supply using the combination of a solar power board 402 and a solar cell. Of course, to save more energy, the display device 401 can be made of light-emitting diodes (LED's). The message is displayed by lighting up or flashing the LED's (not shown). For example, the power is full when five LED's are on, 80% when four LED's are on, and so on.

As mentioned before, the time intervals have two parts. One part is the time interval for the reader 100 to transmit the designated message (the first time interval). The other part is the interval between the time when the active RFID tag 110 leaves its receiving mode and the next time it enters the receiving mode again (the second time interval). The first time interval can be set by pressing buttons on the reader or in a wireless way. For example, it can be set by the user using the function key on the reader 100. Alternatively, the reader can set the first time interval according to the setting from a rear platform received through wireless transmissions. Likewise, the second time interval can be set by pressing buttons on the active RFID tag 110 or in a wireless way (i.e., receiving the designated message transmitted from the reader 100 via the designated channel 102). Please refer to FIG. 5, which is a schematic view showing how to set the time intervals according to the invention. When the user wants to set the second time interval, he can press the function key A 501 on the active RFID tag 110e for five seconds to enter the reset state of the second time interval. Afterwards, the second time interval is set according to the times the function key B 502 is pressed by the user. For example, pressing the function key B 502 once means that the second time interval is set to be 0.1 second; pressing the function key B 502 twice means that the second time interval is set to be 0.2; and so on. Wireless setting of the second time interval is done through the designated message received by the active RFID tag 110e. In this example, after the active RFID tag 110e receives the message packet 120, it obtains an ID code from the ID code field 121 (e.g., the ID code being 1234) and the setting parameter for the second time interval from the command field 122 (e.g., parameter being 0.1 second). The active RFID tag 110e checks its validity according to the ID code in the ID code field 121. When the message packet 120 is valid, the parameter in the command field 122 is used as the second time interval.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A radio frequency identification (RFID) communication system that uses a designated channel for sending certain commands from a reader and a standard channel for other RFID communications, comprising:

the reader, when actuated, initializing the designated channel and transmitting at least one designated message at a first time interval through the designated channel, wherein the designated channel and the standard channel are different channels; and at least one active RFID tag comprising:

a channel initializing module, when actuated, initializing the designated channel from an idle state to a first power state to receive signals from the reader though the designated channel;

a receiving module, triggering a receiving state at a second time interval to receive the designated message;

an identification (ID) module, which, after receiving the designated message, compares an ID code recorded in the designated message with a pre-determined ID code and determines the validity of the designated message according to the comparison result; and a processing module, when the designated message is valid, performing processes corresponding to an executing routine command included in the designated message, wherein the tag uses the standard channel to communicate with the reader and the standard channel operates at a second power state which is higher than the first power state.

2. The RFID communication system of claim 1, wherein the executing routine command further includes parameters that control the active RFID tag to produce an image on a display located on the active RFID tag or make a sound.

3. The RFID communication system of claim 1, wherein the first time interval and the second time interval are set wirelessly.

4. The RFID communication system of claim 1, wherein the second time interval is set according to the designated message transmitted by the reader.

5. The RFID communication system of claim 1, wherein the receiving state is maintained for an amount of time that is set according to the length of the designated message.

6. The RFID communication system of claim 1, wherein the receiving state is maintained for an amount of time that is dynamically adjusted according to whether the complete designated message has been received by the tag.

7. The RFID communication system of claim 1, wherein the pre-determined ID code and the ID code are the device serial numbers of the active RFID tag.

8. The RFID communication system of claim 1, wherein the first time interval is smaller than the second time interval.

9. The RFID communication system of claim 1, wherein the receiving state is maintained for an amount of time that is greater than or equal to the time required for the reader to the transmit the designated message.

10. The RFID communication system of claim 1, wherein the designated message is continuously broadcast for an amount of time that is greater than the second time interval.

11. An RFID communication method that uses a designated channel for sending certain commands from a reader and a standard channel for other RFID communications, comprising the steps of:

initializing the designated channel on the reader and at least one active RFID tag from an idle state to a first power state, wherein the designated channel and the standard channel are different channels;

continuously transmitting at least one designated message in a first time interval via the designated channel by the reader;

triggering a receiving state at a second time interval by the active RFID tag for receiving the designated message, wherein the tag receives the designated message on the designated channel;

after receiving the designated message, comparing a pre-determined ID code with an ID code recorded in the designated message, thereby checking the validity of the designated message; and when the designated message is valid, performing processes corresponding to an executing routine command in the designated message, wherein the tag uses the standard channel to communicate with the reader and the standard channel operates at a second power state which is higher than the first power state.

12. The method of claim 11, wherein the executing routine command further includes parameters that control the active RFID tag to produce an image on a display located on the active RFID tag or make a sound.

13. The method of claim 11, wherein the first time interval and the second time interval are set wirelessly.

14. The method of claim 11, wherein the second time interval is set according to the designated message transmitted by the reader.

15. The method of claim 11, wherein the receiving state is maintained for an amount of time that is set according to the length of the designated message.

16. The method of claim 11, wherein the receiving state is maintained for an amount of time that is dynamically adjusted according to whether the complete designated message has been received by the tag.

17. The method of claim 11, wherein the pre-determined ID code and the ID code are the device serial numbers of the active RFID tag.

18. The method of claim 11, wherein the first time interval is smaller than the second time interval.

19. The method of claim 11, wherein the receiving state is maintained for an amount of time that is greater than or equal to the time required for the reader to the transmit the designated message.

20. The method of claim 11, wherein the designated message is continuously broadcast for an amount of time that is greater than the second time interval.

* * * * *